United States Patent
Ha et al.

(10) Patent No.: US 9,964,794 B2
(45) Date of Patent: May 8, 2018

(54) LIQUID CRYSTAL DISPLAY DEVICE

(71) Applicant: LG DISPLAY CO., LTD., Seoul (KR)

(72) Inventors: Kyung-Su Ha, Gwangju (KR); Ji-Na Jeon, Paju-si (KR); Eun-Woo Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

(21) Appl. No.: 15/363,898

(22) Filed: Nov. 29, 2016

(65) Prior Publication Data

US 2017/0153471 A1 Jun. 1, 2017

(30) Foreign Application Priority Data

Nov. 30, 2015 (KR) .................. 10-2015-0169515

(51) Int. Cl.

| | |
|---|---|
| *G02F 1/1343* | (2006.01) |
| *G02F 1/1334* | (2006.01) |
| *G02F 1/1368* | (2006.01) |
| *G02F 1/1335* | (2006.01) |
| *G02F 1/1362* | (2006.01) |

(52) U.S. Cl.
CPC .......... *G02F 1/1334* (2013.01); *G02F 1/1368* (2013.01); *G02F 1/133514* (2013.01); *G02F 1/133528* (2013.01); *G02F 1/134336* (2013.01); *G02F 1/136286* (2013.01); *G02F 2001/133531* (2013.01); *G02F 2001/134345* (2013.01); *G02F 2202/36* (2013.01)

(58) Field of Classification Search
CPC ............. G02F 1/1334; G02F 1/134336; G02F 1/1368; G02F 1/133528; G02F 1/133514; G02F 1/136286; G02F 2001/134345; G02F 2001/133531; G02F 2202/36
See application file for complete search history.

(56) References Cited

U.S. PATENT DOCUMENTS

| | | | |
|---|---|---|---|
| 5,760,857 A | 6/1998 | Yanagawa et al. | |
| 9,366,920 B2 | 6/2016 | Kim et al. | |
| 2007/0070093 A1* | 3/2007 | Lin | G02F 1/134336 345/694 |
| 2011/0012820 A1* | 1/2011 | Kim | G09G 3/3208 345/82 |

(Continued)

FOREIGN PATENT DOCUMENTS

| | | |
|---|---|---|
| CN | 101153930 A | 4/2008 |
| KR | 10-2014-0037688 A | 3/2014 |
| KR | 10-1443390 B1 | 9/2014 |

*Primary Examiner* — Hoan C Nguyen
(74) *Attorney, Agent, or Firm* — Birch, Stewart, Kolasch & Birch, LLP (57) ABSTRACT

Discussed is a liquid crystal display device according to an embodiment including a substrate including a unit pixel having first to third sub-pixels arranged in a delta structure; and a first electrode and a second electrode in each of the first to third sub-pixels, each of the first and second electrodes including a first bar and a plurality of second bars branching off from the first bar, the first bar of the first electrode and the first bar of the second electrode facing each other and being parallel with each other, the second bars of the first electrode and the second bars of the second electrode interleaved with each other, wherein the first and second bars of the third sub-pixel makes first and second angles, respectively, relative to a first polarization axis.

20 Claims, 9 Drawing Sheets

(56) References Cited

U.S. PATENT DOCUMENTS

2013/0120680 A1* 5/2013 Sun ..................... G02F 1/1368
    349/43
2014/0184984 A1 7/2014 Kim et al.

* cited by examiner

FIG. 1

RELATED ART

LIQUID CRYSTAL DISPLAY DEVICE

CROSSS REFERENCE TO THE RELATED APPLICATIONS

The present application claims the priority benefit of the Korean Patent Application No. 10-2015-0169515 filed in Republic of Korea on Nov. 30, 2015, which is hereby incorporated by reference in its entirety for all purposes as if fully set forth herein.

BACKGROUND OF THE INVENTION

Field of the Invention

The present invention relates to a liquid crystal display device (LCD). In particular, the present invention relates to an LCD including a nano capsule liquid crystal layer.

Discussion of the Related Art

With the advancement of information society, the display field of displaying electric information signals has been rapidly advanced. Accordingly, as flat display devices having advantages of thin profile, light weight and low power consumption, including a liquid crystal display device (LCD), a plasma display panel device (PDP), an electroluminescent display device (ELD), a field emission display device (FED) and the like have been introduced and have rapidly replaced a conventional cathode ray tube (CRT). Among the flat display devices, LCDs are most widely used in the fields of a laptop, monitor, television (TV) because they are excellent in displaying moving images and a high contrast ratio.

Figure 1:
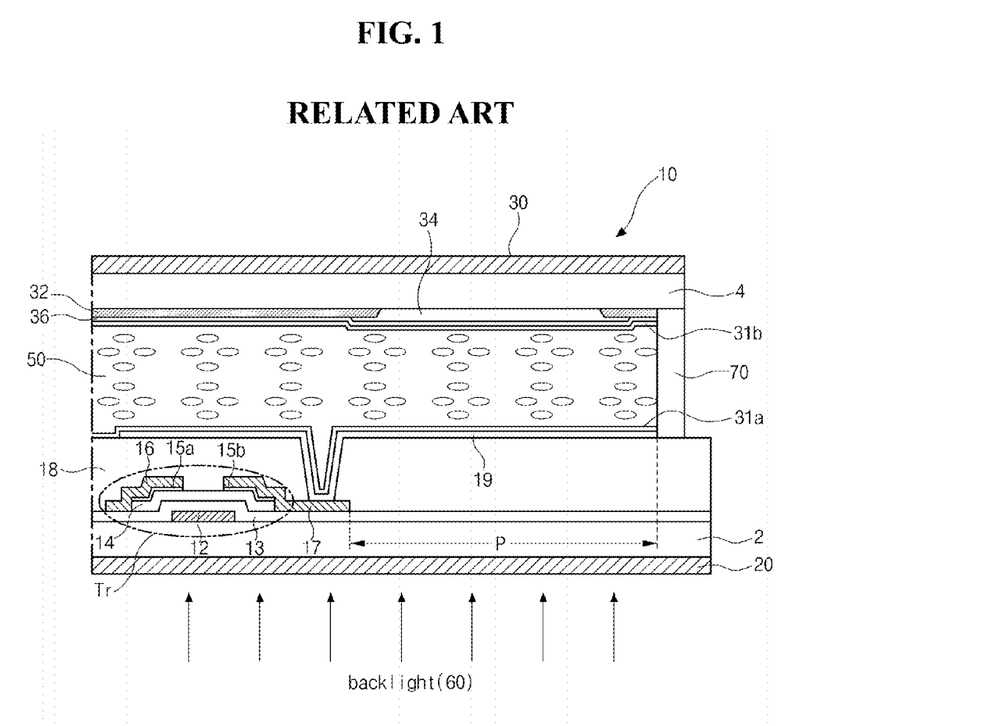
FIG. 1 is a cross-sectional view illustrating an LCD according to the related art.

FIG. 1 is a cross-sectional view illustrating an LCD according to a related art. Referring to FIG. 1, the related art LCD 10 includes a liquid crystal panel having a first substrate 2 and a second substrate 4 attached to each other with a liquid crystal layer 50 therebetween, and a backlight 60.

In detail, a thin film transistor Tr on the first substrate 2 includes a gate electrode 12, a gate insulating layer 13, an active layer 14, ohmic contact layers 15a and 15b, and source and drain electrodes 16 and 17, and is connected to a first electrode 19 in a pixel region P through a contact hole formed in an inter-layered insulating film 18. Further, a black matrix 32 is below the second substrate 4, and has a lattice shape to surround the pixel region P such that the black matrix 32 shields a non-display element such as the thin film transistor Tr and exposes the first electrode 19. Further, a color filter 34 is arranged in the lattice-shaped black matrix 32 corresponding to the pixel region P, and a second electrode is arranged to cover the black matrix 32 and the color filter 34.

Polarizing plates 20 and 30 each selectively transmitting a predetermined polarized light are attached below the first substrate 2 and on the second substrate 4, respectively. Further, a first alignment layer 31a having a surface rubbed in a predetermined direction is between the liquid crystal layer 50 and the first electrode 19, and a second alignment layer 31b having a surface rubbed in a predetermined direction is between the liquid crystal layer 50 and the second electrode 36, and thus initial arrangement state and alignment direction of liquid crystal molecules are uniform. Further, to prevent a leakage of the liquid crystal layer 50, a seal pattern 70 is arranged along edge portions of the first and second substrates 2 and 4. Since the LCD 10 is not self-luminescent, the backlight 60 as a light source is arranged below the liquid crystal panel to supply light to the liquid crystal panel.

As the liquid crystal layer for the LCD 10, a nematic liquid crystal, a smetic liquid crystal, a cholesteric liquid crystal or the like is used, and the nematic liquid crystal is mostly used. However, in the related art LCD 10, there is an disadvantage that an alignment process when attaching the two substrates 2 and 4 is additionally required after the substrates 2 and 4 are individually manufactured. Further, processes of printing and rubbing the alignment layers 31a and 31b to align the liquid crystal are required, and due to this processes, production rate is reduced. Further, a gap between the two substrates 2 and 4 needs to be maintained after attaching the substrates 2 and 4 and injecting the liquid crystal between the substrates 2 and 4, and if a gap between the two substrates changes by an external pressure or impact, display quality may be degraded.

SUMMARY OF THE INVENTION

Accordingly, the present invention is directed to an LCD that substantially obviates one or more of the problems due to limitations and disadvantages of the related art. An object of the present invention is to provide an LCD that can prevent a phenomenon of a non-uniform color coordinate.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present invention, as embodied and broadly described herein, a liquid crystal display device includes a substrate including a unit pixel having first to third sub-pixels arranged in a delta structure; and a first electrode and a second electrode in each of the first to third sub-pixels, each of the first and second electrodes including a first bar and a plurality of second bars branching off from the first bar, the first bar of the first electrode and the first bar of the second electrode facing each other and being parallel with each other, the second bars of the first electrode and the second bars of the second electrode interleaved with each other, wherein the first and second bars of the third sub-pixel makes first and second angles, respectively, relative to a first polarization axis.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE EMBODIMENTS

Reference will now be made in detail to embodiments, examples of which are illustrated in the accompanying drawings. The same or like reference numbers may be used throughout the drawings to refer to the same or like parts.

Figure 2:
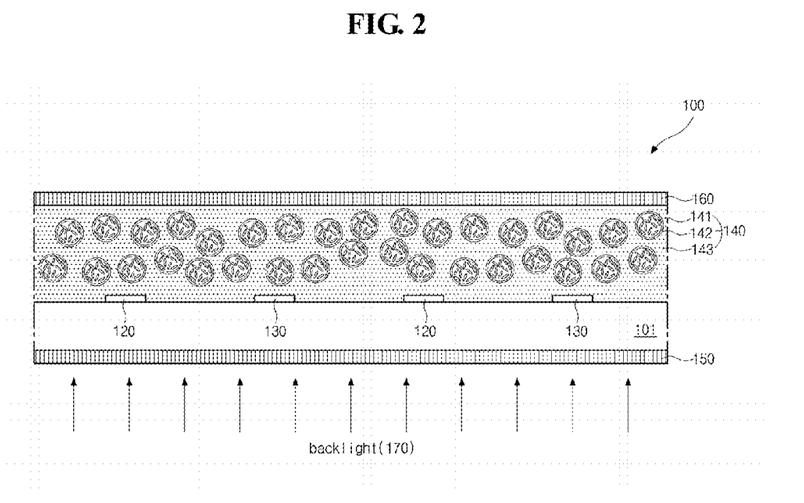
FIG. 2 is a cross-sectional view illustrating an LCD according to an embodiment of the present invention.

FIG. 2 is a cross-sectional view illustrating an LCD 100 according to an embodiment of the present invention. Referring to FIG. 2, the LCD 100 of the embodiment includes a substrate 101, first and second electrodes 120 and 130 on the substrate 101, a nano capsule liquid crystal layer 140 on the first and second electrodes 120 and 130, and first and second polarizing plates 150 and 160 that are below the substrate 101 and directly on the nano capsule liquid crystal layer 140, respectively.

The nano capsule liquid crystal layer 140 is formed with nano capsules 142 that are dispersed in a buffer layer 143. Each nano capsule 142 may have a size less than wavelength of a visible light, e.g., no more than 320 nm, and is filled with liquid crystal molecules 141 randomly aligned. The nano capsule liquid crystal layer 140 including the nano capsules 142, the liquid crystal molecules 141 within the nano capsules 142, and the buffer layer 143 may be formed using a variety of formation methods, such as a printing method, a coating method, or a dropping method. The nano capsule liquid crystal layer 140 may be formed in a film type over the first and second electrodes 120 and 130. Accordingly, unlike the related art LCD using two substrates, the LCD 100 of this embodiment can be manufactured with one substrate 101, and thus the LCD of light weight and thin profile can be achieved, and production cost can be reduced.

Further, the nano capsule liquid crystal layer 140 does not have the problem of the related art that the gap between the related art two substrates becomes non-uniform or changes by an external pressure or impact. Thus, when forming the substrate 101 using a flexible material such as a plastic, the nano capsule liquid crystal layer 140 can be effectively applied to a flexible LCD.

Further, the nano capsule liquid crystal layer 140 has an optical isotropy when an electric field is not applied. However, the nano capsule liquid crystal layer 140 has an optical property that when an electric field is applied, the liquid crystal molecules 141 in the nano capsule 142 are aligned in a direction of the electric field and birefringence of a light incident on the nano capsule liquid crystal layer 140 is produced. Accordingly, the nano capsule liquid crystal layer 140 can form an optical axis according to an applied electric field, and by controlling an optical property using this, a light can be transmitted.

Further, the first polarizing plate 150 produces a polarization of a light to be incident on the nano capsule liquid crystal layer 140 from the backlight 170. The second polarizing plate 160 blocks a light that is incident on the nano capsule liquid crystal layer 140 and then passes through the nano capsule liquid crystal layer 140 without polarization by a birefringence effect of the nano capsule liquid crystal layer 140.

A polarization axis of the first polarizing plate 150 and a polarization axis of the second polarizing plate 160 are perpendicular to each other. For example, if the polarization axis of the first polarizing plate 150 has a 0 or 90 degree angle, the polarization axis of the second polarization plate 160 has a 90 or 0 degree angle.

A principle of operating the LCD 100 including the nano capsule liquid crystal layer 140 is explained below. First, when an electric field is not induced between the first and second electrodes 120 and 130, the nano capsule liquid crystal layer 140 passes through a light entering it through the first polarizing plate 150, and thus the LCD 100 displays a black state.

In other words, in the off state with no electric field being applied, a light entering the first polarizing plate 150 from the backlight 170 is selectively transmitted at a specific angle while passing through the first polarization plate 150, then the light entering the nano capsule liquid crystal layer 140 is transmitted through the nano capsule liquid crystal layer 140 with a minimal scattering phenomenon and then reaches the second polarizing plate 160. Finally, a light passing through the first polarization plate 150 having a polarization axis of, for example, a 0 degree angle enters the second polarization plate 160 having the polarization axis of, for example, a 90 degree angle, thus this light is blocked by the second polarizing plate 160 perpendicular in polarizing axis to the first polarizing plate 150, and thus the LCD 100 displays the black state.

As described above, unlike the related art LCD requiring that a pair of alignment layers are arranged on a pair of substrates opposing to each other, respectively, and a liquid crystal is injected between the substrates and is aligned to have predetermined pitch and direction, the LCD 100 of this embodiment can display the black state using the optical property of the nano capsule liquid crystal layer 140 and thus does not require an additional process of aligning a liquid crystal. Accordingly, the LCD 100 of this embodiment can eliminate processes of printing and rubbing an alignment layer that the related art LCD necessarily requires. In this embodiment, the nano capsule liquid crystal layer 140 may contact the first and second electrodes 120 and 130 without an alignment layer therebetween, and may contact the second polarization plate 160 without an alignment layer therebetween.

When an electric field is induced between the first and second electrodes 120 and 130, the nano capsule liquid crystal layer 140 rotates a polarization axis of a light entering the nano capsule liquid crystal layer 140 through the first polarization plate 150 by a 90 degree angle, and thus the LCD 100 displays a white state. In detail, in the on state with the electric field being induced, since the liquid crystal molecules 141 in the nano capsule 142 are arranged in parallel with a direction of the electric field, a birefringence effect by the alignment of the liquid crystal molecules 141 is produced.

In this case, a light entering the nano capsule liquid crystal layer 140 through the first polarizing plate 150 changes in polarization by the birefringence effect of the nano capsule liquid crystal layer 140. When a retardation, $\Delta n * d$, of the nano capsule liquid crystal layer 140 meets a $\lambda/2$ condition of a light incident thereon, a polarization axis of the incident light is rotated by 90 degree angle, thus this light is not absorbed by the second polarizing plate 160 perpendicular in polarization axis to the first polarizing plate 150 and passes through the second polarizing plate 160, and thus the LCD 100 displays the white state.

Since the LCD 100 including the nano capsule liquid crystal layer 140 controls a light transmission amount through a refractive index of the nano capsule liquid crystal layer 140, liquid crystal molecules having two or three times the refractive index of the liquid crystal molecules of the related art is required. However, since a liquid crystal molecule having a greater refractive index has a greater wavelength dispersion property, a problem may occur that a color coordinate goes awry (e.g., becomes non-uniform) when displaying images and thus a white balance is not achieved.

Further, according to a Kerr effect, an LCD has a property that a refractive index inducement of a short wavelength is produced more than that of a long wavelength when operating the LCD in the same operation condition (electrode, voltage and the like), and because of this property, an efficiency of a blue region is greater than that of a red region. Accordingly, a color coordinate is biased to a blue side, and thus a problem may happen that a bluish image is displayed. Features of this embodiment to resolve the above problems are explained below.

Figure 3:
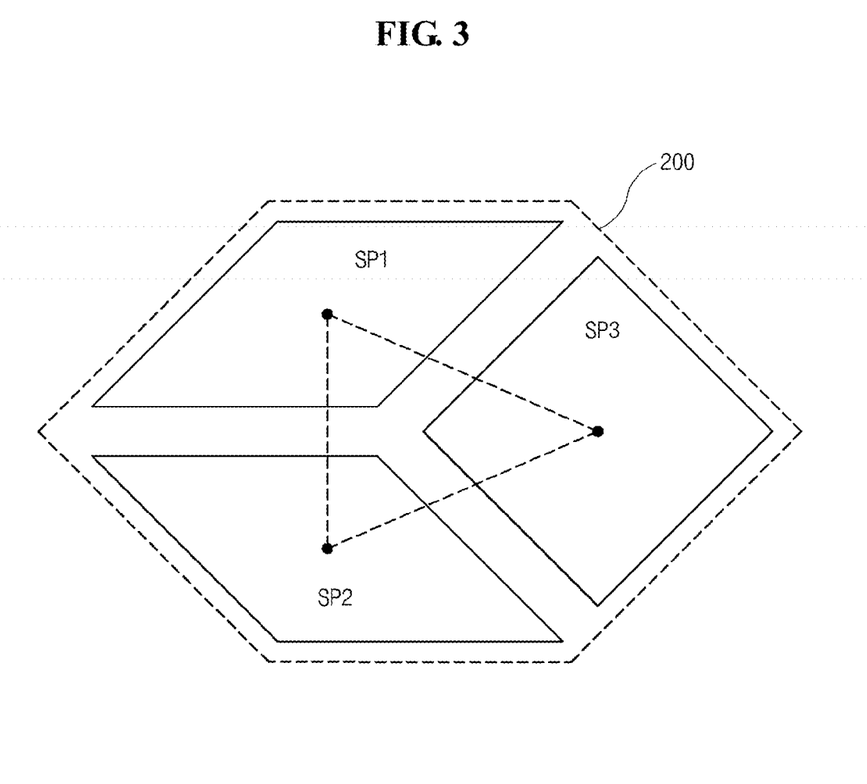
FIG. 3 is a view illustrating unit pixels of an LCD according to the embodiment of the present invention.

FIG. 3 is a view illustrating unit pixels of an LCD according to the embodiment of the present invention. Referring to FIG. 3, a unit pixel 200 includes first to third sub-pixels SP1 to SP3 arranged in a delta (Δ) structure. The first to third sub-pixels SP1 to SP3 may display red, green and blue, respectively, and these sub-pixels SP1 to SP3 constitute one unit pixel 200.

Figure 4A:
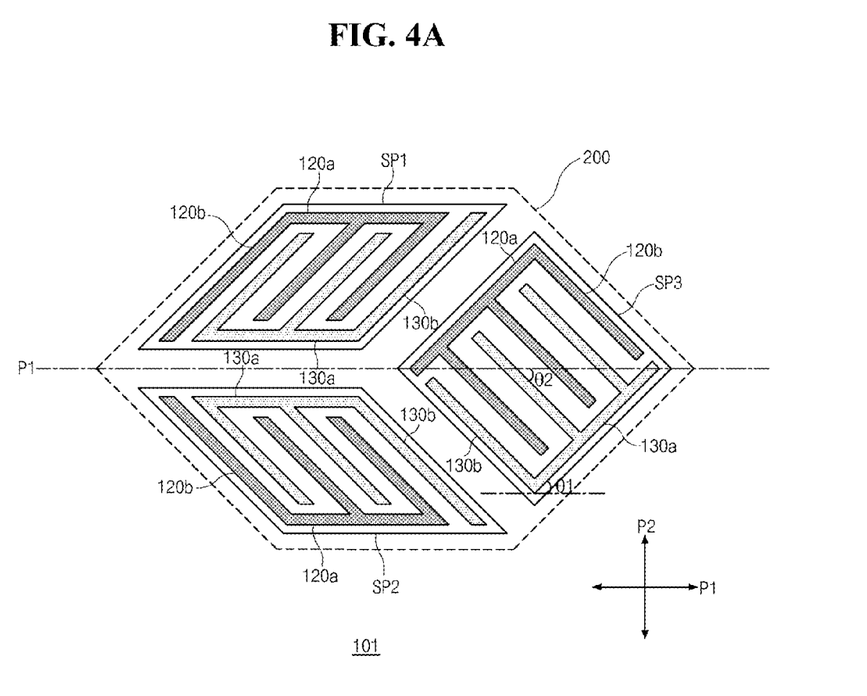
FIGS. 4A and 4B are views illustrating electrode arrangement structures of sub-pixels of a unit pixel of FIG. 3.
Figure 4B:
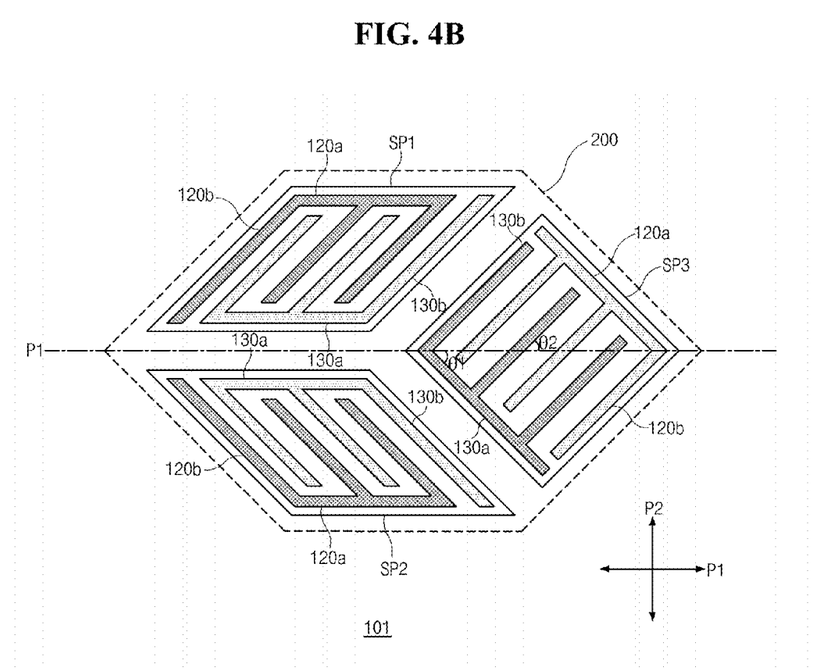

FIGS. 4A and 4B are views illustrating electrode arrangement structures of sub-pixels of a unit pixel of FIG. 3. First, referring to FIGS. 4A and 4B, the LCD of this embodiment includes a substrate 101 including a unit pixel 200, of a delta (Δ) structure, having first to third sub-pixels SP1 to SP3, and first and second electrodes 120 and 130 arranged in each of the first to third sub-pixels SP1 to SP3.

In detail, the first electrode 120 includes a first bar 120a and a plurality of second bars 120b branching off from the first bar 120a forming a fork-like pattern, and the second electrode 130 includes a first bar 130a and a plurality of second bars 130b branching off from the first bar 130a forming a fork-like pattern. Further, the first bar 120a of the first electrode 120 faces and is parallel with the first bar 130a of the second electrode 130, and the second bars 120b of the first electrode 120 are interleaved with the second bars 130b of the second electrode 130 (e.g., the second bars 120b and 130b may alternate).

Electric fields between the first and second bars 120a and 120b of the first electrode 120 and the first and second bars 130a and 130b of the second electrode 130 are produced at the shortest distances between the first and second bars 120a and 120b of the first electrode 120 and the first and second bars 130a and 130b of the second electrode 130, and when an electric field distribution aligns with a first polarization axis P1 or a second polarization axis P2 perpendicular to the first polarization axis P1, a light transmittance is minimized.

Accordingly, in the LCD 100 of this embodiment, the first bars 120a and 130a, and the second bars 120b and 130b of the third sub-pixel SP3 make a first angel θ1, and a second angle θ2, respectively, relative to the first polarization axis P1, thus distributions of electric fields between the first and second bars 120a and 120b of the first electrode 120 and the first and second bars 130a and 130b of the second electrode 130 maximally un-aligns with the first and second polarization axes P1 and P2, and thus a light transmittance can be maximized.

Further, the first angle θ1 and the second angle θ2 may be the same in absolute value, and in order that distributions of electric fields between the first and second bars 120a and 120b of the first electrode 120 and the first and second bars 130a and 130b of the second electrode 130 maximally disaccord with the first and second polarization axes P1 and P2, each of the first angle θ1 and the second angle θ2 may be a 45 degree angle. Further, the first bars 120a and 130a of the first and second sub-pixels SP1 and SP2 are arranged parallel with the first polarization axis P 1.

Further, referring to FIG. 4A, the second bars 120b and 130b of the first sub-pixel SP1 are parallel with the first bars 120a and 130a of the third sub-pixel SP3, and the second bars 120b and 130b of the second sub-pixel SP2 are parallel with the second bars 120b and 130b of the third sub-pixel SP3. Alternatively, referring to FIG. 4B, the second bars 120b and 130b of the first sub-pixel SP1 are parallel with the second bars 120b and 130b of the third sub-pixel SP3, and the second bars 120b and 130b of the second sub-pixel SP2 are parallel with the first bars 120a and 130a of the third sub-pixel SP3.

In this case, distributions of electric fields between the second bars 120b of the first electrode 120 and the second bars 130b of the second electrode 130, in the first and second sub-pixels SP1 and SP2, maximally un-aligns with the first and second polarization axes P1 and P2, and thus a light transmittance is maximized. However, distributions of electric field between the first bar 120a of the first electrode 120 and the second bars 130b of the second electrode 130, and between the first bar 130a of the second electrode 130 and the second bars 120b of the first electrode 120 align with the first or second polarization axis P1 or P2, and thus a transmittance is minimized.

Accordingly, even though the LCD of this embodiment uses liquid crystal molecules having two or three times the refractive index of the related art liquid crystal molecules, by arranging a color filter requiring a relatively greater light transmittance at the third sub-pixel SP3 that has a light transmittance greater than the first and second sub-pixels SP1 and SP2, and arranging a color filter requiring a relatively less light transmittance at the first or second sub-pixel SP1 or SP2, a color coordinate becomes uniform when displaying images and thus a white balance can be achieved.

Particularly, by placing a blue color filter at the first or second sub-pixel SP1 or SP2 and placing a red or green color filter at the third sub-pixel SP3, a color coordinate that is biased to a blue side and display of a bluish image can be prevented. To obtain the above advantage, in the related art, by forming sub-pixels that are different in an electrode interval and an area, light transmittance is adjusted. However, forming sub-pixels in this manner may produce a display defect due to light diffraction. Thus, in this embodiment, along the above-described advantage, by forming the first to third sub-pixels SP1 to SP3 having the same area and the same distance between the second bars 120b and 130b, a display defect due to light diffraction can be prevented.

Figure 5:
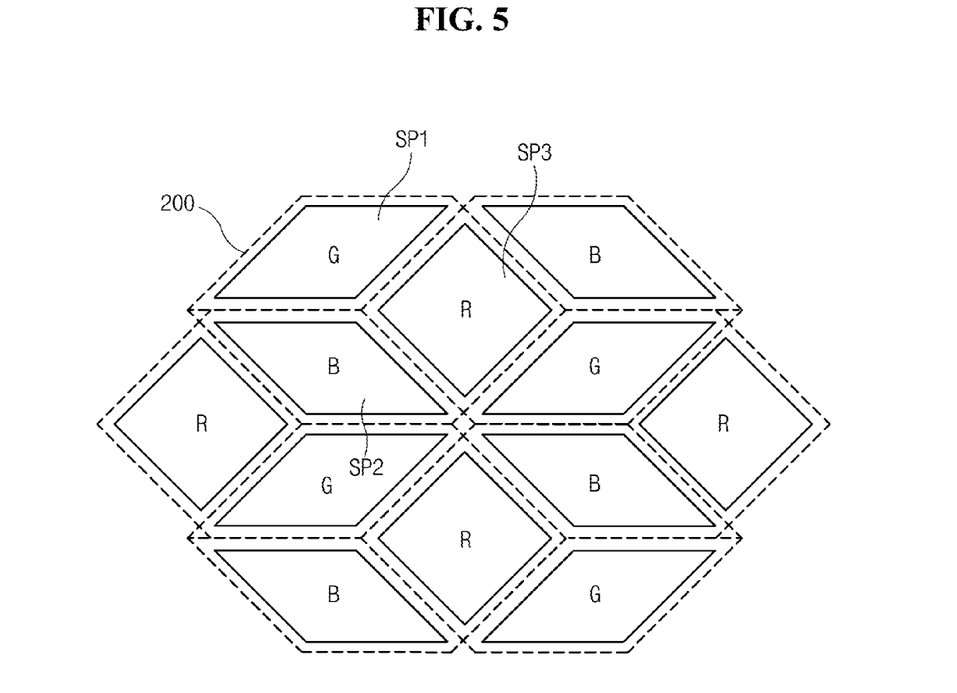
FIG. 5 is a view illustrating a pixel arrangement produced with a plurality of unit pixels according to the embodiment of the present invention.

FIG. 5 is a view illustrating a pixel arrangement produced with a plurality of unit pixels according to the embodiment of the present invention. When the first and second electrodes 120 and 130 are arranged as above, the first and second sub-pixels SP1 and SP2 each have a parallelogram shape, the third sub-pixel SP3 has a rhombus shape, and the unit pixel 200 consisting of the first to third sub-pixels SP1 to SP3 has a hexagon shape.

Further, referring to FIG. 5, the first to third sub-pixels SP1 to SP3 of the delta (Δ) structure may display green (G), blue (B) and red (R), respectively, and these sub-pixels SP1 to SP3 constitute one unit pixel 200. In this case, among the plurality of unit pixels 200, two neighboring unit pixels 200 share the third sub-pixel SP3, and thus more natural image can be displayed.

Figure 6:
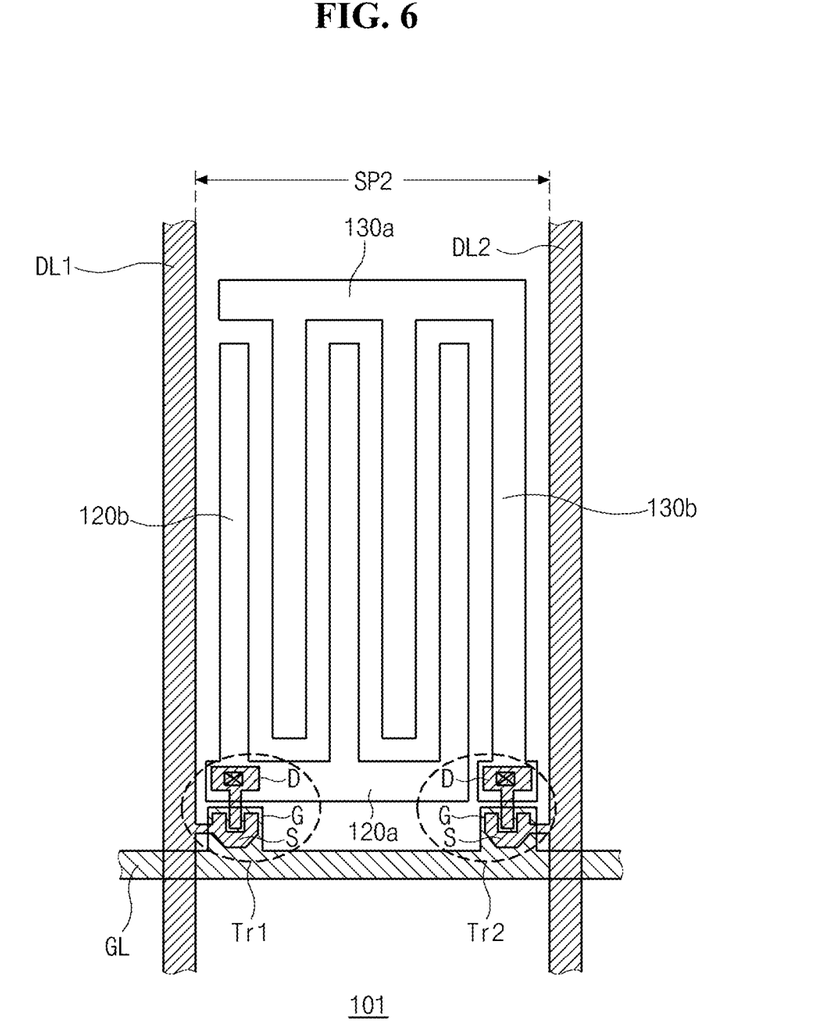
FIG. 6 is a view schematically illustrating the second sub-pixel of FIGS. 4A and 4B.

FIG. 6 is a view schematically illustrating the second sub-pixel of FIGS. 4A and 4B. Since the first to third sub-pixels SP1 to SP3 have the same components and the same relationship between the same components, the second sub-pixel SP2 are representatively explained. Referring to FIG. 6, the LCD 100 of this embodiment includes a gate line GL on a substrate 101, first and second data lines DL1 and DL2 crossing the gate line GL to define the second sub-pixel SP2, first and second electrodes 120 and 130 located in the second sub-pixel SP2, and first and second thin film transistors Tr1 and Tr2.

In detail, the first electrode 120 includes a first bar 120a and a plurality of second bars 120b branching off from the first bar 120a forming a fork-like pattern, and the second electrode 130 includes a first bar 130a and a plurality of second bars 130b branching off from the first bar 130a forming a fork-like pattern. Further, the first bar 120a of the first electrode 120 faces and is parallel with the first bar 130a of the second electrode 130, and the second bars 120b of the first electrode 120 are interleaved with the second bars 130b of the second electrode 130 (e.g., the second bars 120b and 130b may alternate).

Further, the first thin film transistor Tr1 is connected to the gate line GL and the first data line DL1 and supplies a first data voltage to the first electrode 120. The second thin film transistor Tr2 is connected to the gate line GL and the second data line DL2 and supplies a second data voltage, which has a level opposite to a level of the first data voltage, to the second electrode 130.

The first thin film transistor Tr1 includes a gate electrode G connected to the gate line GL, a source electrode S connected to the first data line DL1, and a drain electrode D connected to the first electrode 120. The second thin film transistor Tr2 includes a gate electrode G connected to the gate line GL, a source electrode S connected to the second data line DL2, and a drain electrode D connected to the second electrode 130.

A method of driving the LCD is explained with reference to FIG. 6.

First, in the related art LCD, only a data voltage supplied from a data line to a first electrode is alternated or varied between voltages. In other words, with respect to a constant common voltage supplied from a common line, as a reference, a data voltage supplied from a data line to a first electrode alternates between positive and negative voltages.

However, in the LCD 100 of this embodiment, both the first and second data voltages supplied from the first and second data lines DL1 and DL2 to the first and second electrodes 120 and 130, respectively, alternate or vary between positive and negative voltages. In other words, the first data voltage is supplied from the first data line DL1 to the first electrode 120 alternating between positive and negative voltages with respect to a constant common voltage, and the second data voltage having a level opposite to the level of the first data voltage is supplied from the second data line DL2 to the second electrode 130. Thus, since the LCD 100 of this embodiment applies two times the data voltage of the related art LCD to each of the sub-pixels SP1 to SP3, a light transmittance of the nano capsule liquid crystal layer (140 of FIG. 2) can be improved.

Figure 7:
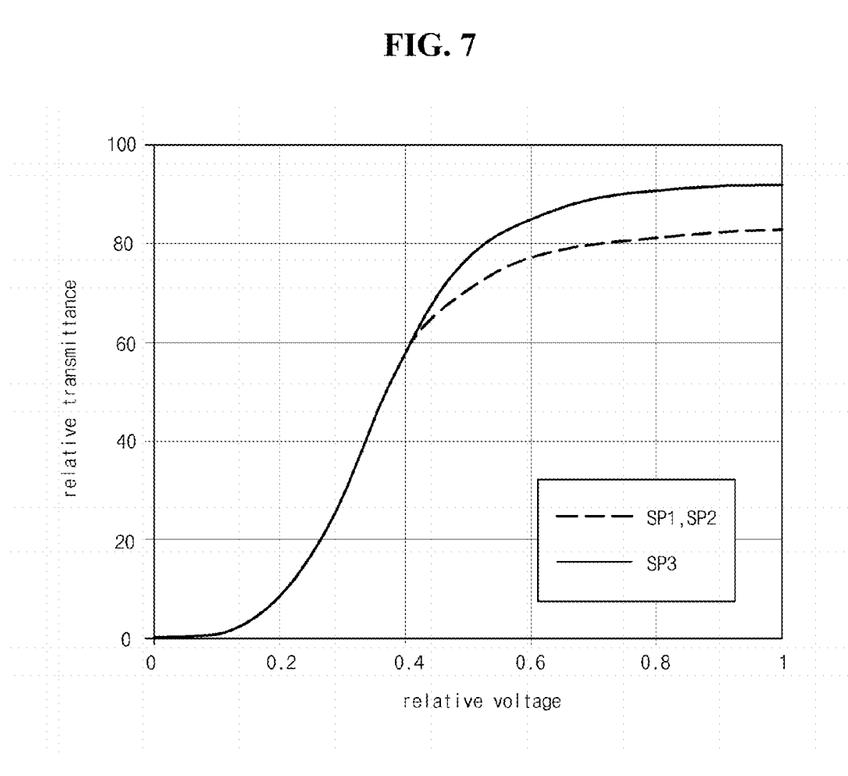
FIG. 7 is a graph illustrating a relative light transmittance to a relative voltage applied to each sub-pixel of the embodiment of the present invention.
Figure 8:
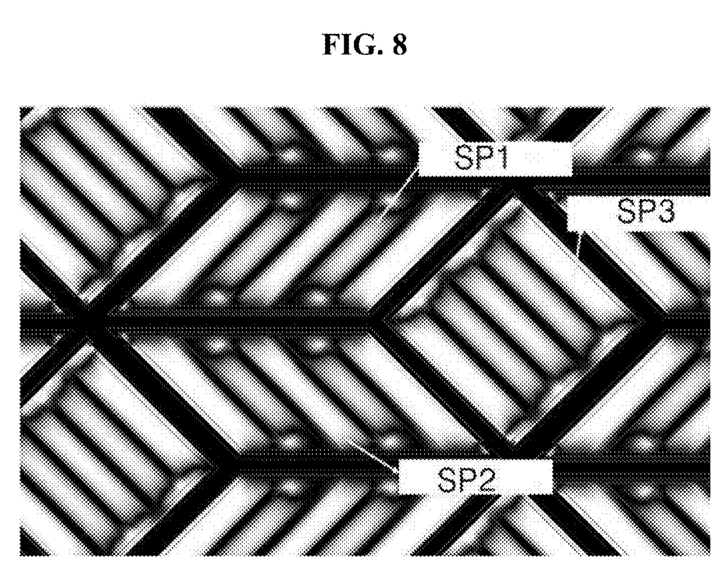
FIG. 8 is a view illustrating brightness by area of each sub-pixel according to the embodiment of the present invention.

FIG. 7 is a graph illustrating a relative light transmittance to a relative voltage applied to each sub-pixel of the embodiment of the present invention. FIG. 8 is a view illustrating brightness by area of each sub-pixel according to the embodiment of the present invention.

Referring to FIG. 7, as a relative voltage increases, a light transmittance of the third sub-pixel SP3 is greater than those of the first and second sub-pixels SP1 and SP2. Accordingly, referring to FIG. 8, a dark state of the third sub-pixel SP3 is minimized compared with the first and second sub-pixels SP1 and SP2.

In detail, regarding the dark state between the first bar 120a of the first electrode 120 and the second bar 130b of the second electrode 130 and between the first bar 130a of the second electrode 130 and the second bar 120b of the first electrode, the first and second sub-pixels SP1 and SP2 are greater than the third sub-pixel SP3. This means that the third sub-pixel SP3 has a light transmittance greater than the first and second sub-pixels SP1 and SP2.

In the above-described embodiment, a uniform color coordinate when displaying images and a white balance can be achieved, and particularly, it a color coordinate that is biased to a blue side and display of a bluish image can be prevented.

Further, processes of printing and rubbing an alignment layer required in the related art can be eliminated, and the LCD can be manufactured with one substrate. Thus, an LCD of thin profile and light weight can be achieved and production cost can be reduced.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

What is claimed is:

1. A liquid crystal display device, comprising:
   a substrate including a unit pixel having first to third sub-pixels arranged in a delta structure; and
   a first electrode and a second electrode in each of the first to third sub-pixels, each of the first and second electrodes including a first bar and a plurality of second bars branching off from the first bar, the first bar of the first electrode and the first bar of the second electrode facing each other and being parallel with each other, the second bars of the first electrode and the second bars of the second electrode interleaved with each other,
   wherein the first and second bars of the third sub-pixel makes first and second angles, respectively, relative to a first polarization axis.

2. The liquid crystal display device of claim 1, wherein the first bar of each of the first and second sub-pixels is parallel with the first polarization axis, wherein the second bar of the first sub-pixel is parallel with the first or second bar of the third sub-pixel, and wherein the second bar of the second sub-pixel is parallel with the second or first bar of the third sub-pixel.

3. The liquid crystal display device of claim 2, wherein the first and second angles are the same in absolute value.

4. The liquid crystal display device of claim 3, wherein the first and second angles are 45 degree angles relative to the first polarization axis.

5. The liquid crystal display device of claim 3, wherein each of the first and second sub-pixels has a parallelogram shape, the third sub-pixel has a rhombus shape, and the unit pixel has a hexagon shape.

6. The liquid crystal display device of claim 5, wherein the first to third sub-pixels have the same area and have the same distance between the corresponding second bars of the first to third sub-pixels.

7. The liquid crystal display device of claim 2, further comprising first and second thin film transistors connected to the first and second electrodes, respectively.

8. The liquid crystal display device of claim 2, further comprising:
a nano capsule liquid crystal layer that is on and contacts the first and second electrodes;
a first polarizing plate below the substrate and having the first polarization axis; and
a second polarizing plate that is on and contacts the nano capsule liquid crystal layer, and has a second polarization axis perpendicular to the first polarization axis.

9. The liquid crystal display device of claim 8, wherein the nano capsule liquid crystal layer is configured in a film type.

10. The liquid crystal display device of claim 8, wherein the nano capsule liquid crystal layer includes a plurality of nano capsules that are dispersed in a buffer layer.

11. The liquid crystal display device of claim 10, wherein a nano capsule of the plurality of nano capsules has a size less than wavelengths of a visible light and is filled with liquid crystal molecules randomly aligned.

12. The liquid crystal display device of claim 1, wherein at least one of the first and second sub-pixels includes a blue color filter, and the third sub-pixel includes a red or green color filter.

13. The liquid crystal device of claim 1, further comprising:
a first data line and a second data line for the first to third sub-pixels,
the first data line supplying a first data voltage to a respective first electrode,
the second data line supplying a second data voltage to a respective second electrode, wherein the second data voltage has a level opposite to a level of the first data voltage.

14. A liquid crystal display device, comprising:
a substrate including a unit pixel of a delta structure including first to third sub-pixels;
a first electrode and a second electrode formed on the substrate in each of the first to third sub-pixels;
a nano capsule liquid crystal layer on the first and second electrodes; and
a first polarizing plate below the substrate and a second polarizing plate directly on the nano capsule liquid crystal layer,
wherein the unit pixel has a hexagon shape.

15. The liquid crystal display device of claim 14, wherein each of the first and second electrodes includes a first bar and a plurality of second bars branching off from the first bar, the first bar of the first electrode and the first bar of the second electrode facing each other and being parallel with each other, the second bars of the first electrode and the second bars of the second electrode interleaved with each other, and
wherein the first and second bars of the third sub-pixel make first and second angles, respectively, relative to a first polarization axis.

16. The liquid crystal display device of claim 15, further comprising:
a first data line and a second data line for the first to third sub-pixels,
the first data line supplying a first data voltage to a respective first electrode,
the second data line supplying a second data voltage to a respective second electrode,
wherein the second data voltage has a level opposite to a level of the first data voltage.

17. The liquid crystal display device of claim 14, wherein at least one of the first and second sub-pixels includes a blue color filter, and the third sub-pixel includes a red or green color filter.

18. The liquid crystal display device of claim 14, wherein the nano capsule liquid crystal layer is configured in a film type.

19. The liquid crystal display device of claim 14, wherein the nano capsule liquid crystal layer includes a plurality of nano capsules that are dispersed in a buffer layer.

20. The liquid crystal display device of claim 19, wherein a nano capsule of the plurality of nano capsules has a size less than wavelengths of a visible light and is filled with liquid crystal molecules randomly aligned.

* * * * *